United States Patent
Kotra et al.

(10) Patent No.: US 12,197,378 B2
(45) Date of Patent: Jan. 14, 2025

(54) METHOD AND APPARATUS TO EXPEDITE SYSTEM SERVICES USING PROCESSING-IN-MEMORY (PIM)

(71) Applicant: ADVANCED MICRO DEVICES, INC., Santa Clara, CA (US)

(72) Inventors: Jagadish B. Kotra, Austin, TX (US); Kishore Punniyamurthy, Austin, TX (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 17/804,949

(22) Filed: Jun. 1, 2022

(65) Prior Publication Data

US 2023/0393849 A1  Dec. 7, 2023

(51) Int. Cl.
*G06F 15/78* (2006.01)
*G06F 9/30* (2018.01)

(52) U.S. Cl.
CPC ...... *G06F 15/7821* (2013.01); *G06F 9/30043* (2013.01); *G06F 9/30029* (2013.01)

(58) Field of Classification Search
CPC ......... G06F 15/7821; G06F 2212/7205; G06F 12/0253; G06F 12/0891; G06F 9/30043; G06F 9/30029

See application file for complete search history.

(56) References Cited

U.S. PATENT DOCUMENTS

| | | | |
|---|---|---|---|
| 5,903,916 A | 5/1999 | Pawlowski et al. | |
| 6,553,465 B1 | 4/2003 | Takusagawa | |
| 6,601,153 B1 * | 7/2003 | Engelbrecht | G06F 12/08 707/999.2 |
| 6,944,746 B2 | 9/2005 | So | |
| 6,973,541 B1 * | 12/2005 | Williams | G06F 12/0891 711/135 |
| 7,047,393 B2 | 5/2006 | Paver et al. | |
| 8,359,462 B1 | 1/2013 | Khan et al. | |
| 9,348,539 B1 * | 5/2016 | Saxena | G11C 11/005 |
| 9,575,815 B1 | 2/2017 | Guthrie et al. | |

(Continued)

FOREIGN PATENT DOCUMENTS

| | | | |
|---|---|---|---|
| WO | 2014120193 A1 | 8/2014 | |
| WO | WO-2021028723 A2 * | 2/2021 | ......... G06F 12/0646 |

(Continued)

OTHER PUBLICATIONS

Chang Hyun Kim, Won Jun Lee, Yoonah Paik, Kiyong Kwon, Seok Young Kim, II Park, and Seon Wook Kim, "Silent-PIM: Realizing the Processing-in-Memory Computing With Standard Memory Requests", March, IEEE and pp. 251-262 (Year: 2021).*

(Continued)

*Primary Examiner* — Courtney P Spann

(57) ABSTRACT

An apparatus configured for offloading system service tasks to a processing-in-memory ("PIM") device includes an agent configured to: receive, from a host processor, a request to offload a memory task associated with a system service to the PIM device; determine at least one PIM command and at least one memory page associated with the host processor based upon the request; and issue the at least one PIM command to the PIM device for execution by the PIM device to perform the memory task upon the at least one memory page.

18 Claims, 8 Drawing Sheets

(56) References Cited

U.S. PATENT DOCUMENTS

| | | | |
|---|---|---|---|
| 10,061,588 | B2 | 8/2018 | Gschwind et al. |
| 10,282,292 | B2* | 5/2019 | Prodromou ............ G06F 9/5027 |
| 11,043,259 | B2* | 6/2021 | Wentzlaff ............... H03K 19/21 |
| 11,355,170 | B1 | 6/2022 | Yudanov |
| 11,568,907 | B2* | 1/2023 | Mathew ............... G11C 7/1048 |
| 11,594,274 | B2 | 2/2023 | Murphy |
| 11,625,249 | B2 | 4/2023 | Kotra et al. |
| 11,663,008 | B2 | 5/2023 | Lee et al. |
| 11,868,777 | B2 | 1/2024 | Kalamatianos et al. |
| 11,921,634 | B2 | 3/2024 | Kotra et al. |
| 2005/0015538 | A1 | 1/2005 | Van't Wout et al. |
| 2005/0246698 | A1 | 11/2005 | Chung |
| 2008/0046692 | A1 | 2/2008 | Michalak et al. |
| 2008/0244185 | A1 | 10/2008 | O'Krafka et al. |
| 2011/0242113 | A1 | 10/2011 | Keall et al. |
| 2012/0159077 | A1* | 6/2012 | Steely, Jr. ........... G06F 12/0804 |
| | | | 711/E12.044 |
| 2013/0086367 | A1 | 4/2013 | Gschwind et al. |
| 2014/0281405 | A1 | 9/2014 | Streett et al. |
| 2016/0092238 | A1 | 3/2016 | Codrescu et al. |
| 2016/0155491 | A1 | 6/2016 | Roberts et al. |
| 2017/0060588 | A1 | 3/2017 | Choi |
| 2017/0123987 | A1 | 5/2017 | Cheng et al. |
| 2017/0262369 | A1 | 9/2017 | Murphy |
| 2017/0344480 | A1 | 11/2017 | Beard et al. |
| 2018/0089081 | A1 | 3/2018 | Ramalingam |
| 2018/0188961 | A1 | 7/2018 | Venkatesh et al. |
| 2018/0336035 | A1 | 11/2018 | Choi et al. |
| 2019/0138313 | A1 | 5/2019 | Lin |
| 2019/0377580 | A1 | 12/2019 | Vorbach et al. |
| 2020/0035291 | A1 | 1/2020 | Kasibhatla et al. |
| 2020/0174931 | A1 | 6/2020 | Williams et al. |
| 2020/0192757 | A1 | 6/2020 | Qin et al. |
| 2020/0218540 | A1 | 7/2020 | Kesiraju et al. |
| 2020/0294558 | A1* | 9/2020 | Yu ......................... G11C 7/1039 |
| 2021/0271680 | A1 | 9/2021 | Lee et al. |
| 2021/0349826 | A1 | 11/2021 | Roy et al. |
| 2022/0076717 | A1 | 3/2022 | Mathew et al. |
| 2022/0156081 | A1 | 5/2022 | Seo et al. |
| 2022/0188117 | A1 | 6/2022 | Kalamatianos et al. |
| 2022/0188233 | A1 | 6/2022 | Kalamatianos et al. |
| 2022/0206817 | A1 | 6/2022 | Kotra et al. |
| 2022/0206855 | A1 | 6/2022 | Challapalle et al. |
| 2022/0237041 | A1* | 7/2022 | Lee ......................... G06F 9/541 |
| 2022/0292033 | A1 | 9/2022 | Yu et al. |
| 2023/0205693 | A1 | 6/2023 | Kotra et al. |
| 2023/0244442 | A1 | 8/2023 | Lee et al. |
| 2023/0244492 | A1 | 8/2023 | Kotra et al. |
| 2024/0126552 | A1 | 4/2024 | Kalamatianos et al. |

FOREIGN PATENT DOCUMENTS

| | | | |
|---|---|---|---|
| WO | 2022132795 | A1 | 6/2022 |
| WO | 2022146793 | A1 | 7/2022 |

OTHER PUBLICATIONS

Aga et al., "Co-ML: A Case for Collaborative ML Acceleration using Near-Data Processing", MemSys '19: Proceedings of the International Symposium on Memory Systems, DOI: 10.1145/3357526.3357532, dated Sep. 2019, 12 pages.

Ahn et al., "PIM-Enabled Instructions: A Low-Overhead, Locality-Aware Processing-in-Memory Architecture", 2015 ACM/IEEE 42nd Annual International Symposium on Computer Architecture (ISCA), DOI:10.1145/2749469.2750385, Jun. 2015, 13 pages.

Andi Kleen (andi@firstfloor.org), Memory Offlining, /sys/devices/system/memory/hard_offline_page, URL: https://www.kernel.org/doc/Documentation/ABI/testing/sysfs-memory-page-offline, dated Sep. 2009, 1 page.

Boroumand et al., "LazyPIM: Efficient Support for Cache Coherence in Processing-in-Memory Architectures", IEEE Computer Architecture Letters, vol. 16, Issue 1, DOI:10.1109/LCA.2016.2577557, dated Jun. 2016, 12 pages.

Challapalle et al., Offloading Computations From a Processor to Remote Execution Logic, United States Patent & Trademark Office (USPTO), U.S. Appl. No. 17/136,767, filed Dec. 29, 2020, 38 pages.

Denby et al., "Orbital Edge Computing: Nanosatellite Constellations as a New Class of Computer System", Proceedings of the Twenty-Fifth International Conference on Architectural Support for Programming Languages and Operating Systems (ASPLOS '20), Mar. 2020, pp. 939-954, IEEE, United States, URL: https://doi.org/10.1145/3373376.3378473.

Farmahini-Farahani et al., "NDA: Near-DRAM Acceleration Architecture Leveraging Commodity DRAM Devices and Standard Memory Modules", 2015 IEEE 21st International Symposium on High Performance Computer Architecture (HPCA), DOI: 10.1109/HPCA.2015.7056040, dated Mar. 2015, 13 pages.

Gao et al., "ComputeDRAM: In-Memory Compute Using Off-the-Shelf DRAMs", Proceedings of the 52nd Annual IEEE/ACM International Symposium on Microarchitecture (MICRO '52), Oct. 2019, pp. 100-113, IEEE, URL: https://doi.org/10.1145/3352460.3358260.

Ghose et al., "A Workload and Programming Ease Driven Perspective of Processing-in-Memory", IBM Journal of Research & Development, vol. 63, Issue: 6, Nov. 2019, IBM, United States.

Ghose et al., "Enabling the Adoption of Processing-in-Memory: Challenges, Mechanisms", Future Research Directions, Carnegie Mellon University Invited Book Chapter, 45 pages, Feb. 2018, Cornell University (online: arXiv.org), URL: https://arxiv.org/pdf/1802.00320.pdf.

IBM Corporation, "dcbf (Data Cache Block Flush) instruction", IBM Documentation, URL: https://www.ibm.com/docs/en/aix/7.2?topic=set-dcbf-data-cache-block-flush-instruction, 2020, printed May 4, 2021, 3 pages.

IBM Corporation, dcbi (Data Cache Block Invalidate) instruction, IBM Documentation, URL: https://www.ibm.com/docs/en/aix/7.2?topic=set-dcbi-data-cache-block-invalidate-instruction, 2020, printed May 4, 2021, 3 pages.

International Search Report and Written Opinion, PCT/US2021/063345, Apr. 4, 2022, 9 pages.

Islam et al., "Improving Node-Level MapReduce Performance Using Processing-in-Memory Technologies", European Conference on Parallel Processing (Euro-Par 2014: Parallel Processing Workshops), pp. 425-437, Springer International Publishing, Switzerland.

Jonathan Corbet, AutoNUMA: the other approach to NUMA scheduling, URL: https://lwn.net/Articles/488709/, dated Mar. 27, 2012, 5 pages.

Kalamatianos et al., Processor-Guided Execution of Offloaded Instructions Using Fixed Function Operations, United States Patent & Trademark Office (USPTO), U.S. Appl. No. 17/123,270, filed Dec. 16, 2020, 47 pages.

Kim, "A Journey to a Commercial-Grade Processing-In-Memory (PIM) Chip Development", The 27th IEEE International Symposium on High-Performance Computer Architecture (HPCA-27), Mar. 2021, Samsung, Seoul, South Korea, URL: https://hpca-conf.org/2021/keynotes/, 3 pages (abstract only, specifically pp. 2-3).

Kotra et al., Preserving Memory Ordering Between Offloaded Instructions and Non-Offloaded Instructions, United States Patent & Trademark Office (USPTO), U.S. Appl. No. 17/137,140, filed Dec. 29, 2020, 52 pages.

Kwon et al., 25.4 A 20nm 6GB Function-In-Memory DRAM, Based on HBM2 with a 1.2TFLOPS Programmable Computing Unit Using Bank-Level Parallelism, for Machine Learning Applications, IEEE, 2021 IEEE International Solid-State Circuits Conference (ISSCC),URL: https://safari.ethz.ch/architecture_seminar/fall2021/lib/exe/fetch.php?media=kwon2021fimdram.pdf, DOI: 10.1109/ISSCC42613.2021.9365862, Date Added to IEEE Xplore: Mar. 3, 2021, 3 pages.

Loh et al., "A Processing-in-Memory Taxonomy and a Case for Studying Fixed-function PIM", 3rd Workshop on Near-Data Processing, Dec. 2013, 4 pages, University of Utah.

Mutlu et al., "Enabling Practical Processing in and near Memory for Data-Intensive Computing", Proceedings of the 56th Annual Design Automation Conference (DAC '19), Jun. 2019, Article No. 21 pp. 1-4, https://doi.org/10.1145/3316781.3323476.

(56) References Cited

OTHER PUBLICATIONS

Mutlu et al., "Processing Data Where It Makes Sense: Enabling In-Memory Computation", Journal of Microprocessors and Microsystems, vol. 67, Jun. 2019, pp. 28-41, Elsevier B.V., Amsterdam, The Netherlands.

Nam Sung Kim, A Journey to a Commercial-Grade Processing-In-Memory (PIM) Chip Development, HPCA 2021, The 27th IEEE International Symposium on High-Performance Computer Architecture (PCA-27), Seoul, South Korea, URL: https://hpca-conf.org/2021/keynotes/, dated Mar. 3, 2021, 3 pages.

Nyasulu, "System Design for a Computational-RAM Login-In-Memory Parallel Processing Machine", PhD Thesis, May 1999, 196 pages, Carleton University, Ottawa, ON, Canada.

Pugsley et al., "Analyzing the Impact of 3D-stacked Memory+Logic Devices on MapReduce Workloads", 2014 IEEE International Symposium on Performance Analysis of Systems and Software (ISPASS), Marcy 2014, pp. 190-200, IEEE, United States.

Seshadri et al., "RowClone: Fast and Energy-Efficient In-DRAM Bulk Data Copy and Initialization", 2013 46th Annual IEEE/ACM International Symposium on Microarchitecture (MICRO), DOI:10.1145/2540708.2540725, dated Dec. 2013, 13 pages.

Singh et al., "A Review of Near-Memory Computing Architectures: Opportunities and Challenges", EuroMicro Conference on DSD, Aug. 2018, 10 pages, IEEE, United States, DOI: 10.1109/DSD.2018.00106.

Yang et al., "A Processing-in-Memory Architecture Programming Paradigm for Wireless Internet-of-Things", Applications, Sensors Journal, Jan. 2019, 23 pages, MDPI, Basel, Switzerland.

International Search Report and Written Opinion, PCT/US2022/052886, Mar. 20, 2023, 11 pages.

Santos et al., "Processing in 3D memories to speed up operations on complex data structures," 2018 Design, Automation & Test in Europe Conference & Exhibition (DATE), Date of Conference: Mar. 19-23, 2018, Dresden, Germany, DOI: 10.23919/DATE.2018.8342135, Date Added to IEEE Xplore: Apr. 23, 2018, 4 pages.

International Search Report and Written Opinion, PCT/US2021/064663, May 10, 2022, 12 pages.

Ghose et al., "Processing-in-memory: A workload-driven perspective," IBM Journal of Research and Development, DOI: 10.1147/JRD.2019.2934048, vol. 63, Issue 6, Date of Publication: Aug. 8, 2019, 19 pages.

Kim et al., "Exploration of a PIM Design Configuration for Energy-Efficient Task Offloading," 2019 IEEE International Symposium on Circuits and Systems (ISCAS), Date of Conference: May 26-29, 2019, Sapporo, Japan, DOI: 10.1109/ISCAS.2019.8702339, Date Added to IEEE Xplore: May 1, 2019, 4 pages.

Lee et al., "Design of Processing-"Inside"-Memory Optimized for DRAM Behaviors," IEEE Access, vol. 7,DOI: 10.1109/ACCESS.2019.2924240; Date of Publication: Jun. 21, 2019, 16 pages.

Nai et al., "GraphPIM: Enabling Instruction-Level PIM Offloading in Graph Computing Frameworks," 2017 IEEE InternationalSymposium on High Performance Computer Architecture (HPCA), Date of Conference: Feb. 4-8, 2017, Austin, TX, DOI: 10.1109/HPCA.2017.54, Date Added to IEEE Xplore: May 8, 2017, 12 pages.

Pattnaik et al., "Scheduling Techniques for GPU Architectures with Processing-In-Memory Capabilities," PACT '16: Proceedings of the 2016 International Conference on Parallel Architectures and Compilation, DOI: http://dx.doi.org/10.1145/2967938.2967940, Published Sep. 11, 2016, 14 pages.

Xu et al., "TUPIM: A Transparent and Universal Processing-in-Memory Architecture for Unmodified Binaries," GLSVLSI '20: Proceedings of the 2020 on Great Lakes Symposium on VLSI, Sep. 7-9, 2020, Virtual Event, China, https://doi.org/10.1145/3386263.3406896, Published: Sep. 7, 2020, 6 pages.

\* cited by examiner

METHOD AND APPARATUS TO EXPEDITE SYSTEM SERVICES USING PROCESSING-IN-MEMORY (PIM)

BACKGROUND

Computing systems often include a number of processing resources, such as processors or processor cores, which can retrieve instructions, execute instructions, and store the results of executed instructions to memory. A processing resource can include a number of functional units such as arithmetic logic units (ALUs), floating point units (FPUs), and combinatorial logic blocks, among others. Typically, such functional units are local to the processing resources. That is, functional units tend to be implemented as part of a processor and are separate from memory devices in which data to be operated upon is retrieved and data forming the results of operations is stored. Such data can be accessed via a bus between the processing resources and memory.

Processing performance can be improved by offloading operations that would normally be executed in the functional units to a processing-in-memory (PIM) device. PIM refers to an integration of compute and memory for execution of instructions that would otherwise be executed by a computer system's primary processor or processor cores. In some implementations, PIM devices incorporate both memory and functional units in a single component or chip. Although PIM is often implemented as processing that is incorporated 'in' memory, this specification does not limit PIM so. Instead, PIM may also include so-called processing-near-memory implementations and other accelerator architectures. That is, the term 'PIM' as used in this specification refers to any integration—whether in a single chip or separate chips—of compute and memory for execution of instructions that would otherwise be executed by a computer system's primary processor or processor core. In this way, instructions executed in a PIM architecture are executed 'closer' to the memory accessed in executing the instruction. A PIM device can therefore save time by reducing or eliminating external communications and can also conserve power that would otherwise be necessary to process memory communications between the processor and the memory.

DETAILED DESCRIPTION

Figure 1:
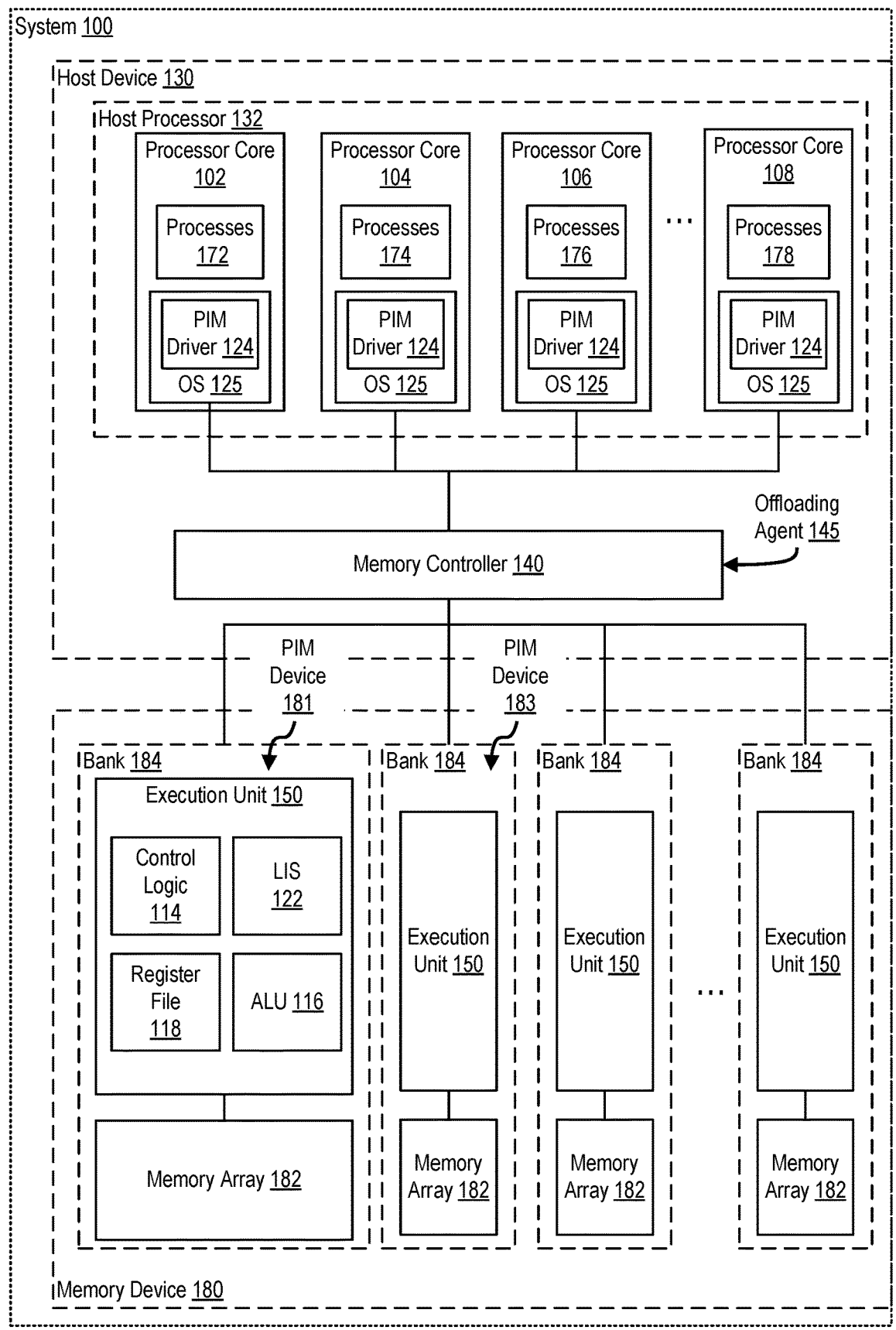
FIG. 1 sets forth a block diagram of an example system 100 for offloading of system services tasks to a PIM device in accordance with the present disclosure.

As mentioned above, PIM architectures support operations to be performed in, at, or near to the memory module storing the data on which the operations are performed on or with. Such an architectures allows for improved computational efficiency through reduced data transfer as well as reduced power consumption. In some implementations, a PIM architecture supports offloading instructions from a host processor for execution in memory or near memory, such that bandwidth on the data link between the processor and the memory is conserved and power consumption of the processor is reduced. The execution of PIM instructions by a PIM device does not require loading data into local CPU/GPU registers and writing data from local CPU/GPU storage back to the memory. In fact, any processing element that is coupled to memory for execution of operations can benefit from PIM device execution.

PIM enables memory bound applications to execute efficiently by offloading instructions to be executed on PIM logic embedded in memory. PIM hardware on the memory side contains PIM registers that hold the data on which a computation is performed by the PIM logic. The host processor is enabled with new instructions including PIM Load (PIM-Ld), PIM operation (PIM-Op), and PIM Store (PIM-St) to offload computations from the host processor to PIM logic. The PIM-Ld instruction loads the data from memory locations into registers on the PIM logic, while the PIM-Op instruction specifies a type of computation to be performed on the data read from the memory locations. The PIM-St instruction copes the data from the PIM registers into memory cells. In addition to the PIM-Ld, PIM-St instructions, additional memory operations including PIM Read (PIM-Rd) and PIM Write (PIM-Wr) operations are available. The PIM-Rd operation allows reading data in PIM registers to a memory controller, whereas PIM-Wr allows writing data (e.g., constants) from the memory controller to the PIM registers.

A memory copy operation may be performed by using PIM logic by issuing a series of PIM-Lds and PIM-Sts. The PIM-Ld reads data from a source memory location into PIM registers, and the PIM-St copies the data from the PIM registers to a target memory location. Similarly, a memory update to a location may be performed by reading data from the corresponding memory location by a PIM-Ld followed by a PIM-Op that updates the content, and further followed by a PIM-St to the same memory location that copies the updated data form the PIM registers.

Previously, PIM offloads were restricted to applications and user-level libraries. Implementations in accordance with the present disclosure provide for leveraging PIM to expedite system software services by offloading one or more system services to a PIM device. Based on the observation that system software executes various memory-bound tasks that unnecessarily fetch low locality data on-chip, implementations in accordance with the present disclosure provide offloading of such low locality tasks to PIM hardware to reduce data movement significantly and thereby improving overall execution efficiency. Accordingly, improved performance and reduced energy consumption may be obtained. In one aspect, "locality" may refer to a tendency of a processor to access the same set of memory locations over a period of time. Temporal locality refers to the reuse of specific data and/or resources within a relatively small time duration. Spatial locality refers to the use of data elements within relatively close storage locations. Accordingly, low locality tasks include tasks in which the reuse of storage locations over a period of time by the host processor is relatively low.

System software, such as an operating system, provides various system services and may use hypervisors to execute several tasks that are either periodic in nature or are triggered based on certain events. Examples on such events include process termination or changes in the system state. A large portion of these tasks have low locality and are memory bound in nature. Examples of low-locality and memory-bound system services tasks include:

(1) Zeroing memory pages of a process once it terminates. The memory page zeroing task in system software ensures that data in memory pages from a prior terminated process is not leaked to a subsequent process when these memory pages are assigned to a new process.

(2) Copy-on-Write Optimizations for Kernel Same page Merging (KSM) in which hypervisors de-duplicate memory to reduce the overall memory footprint. This task is performed by pointing several memory pages across virtual machines that contain the same data values to one physical memory page. Upon a write to one of the pages, the de-duplicated page needs to be copied to the new page.

(3) Memory page migration in which memory pages are moved from one location in memory to another due to various reasons such as memory compaction or memory offlining.

Accordingly, implementations in accordance with the present disclosure provide for offloading of system services tasks exhibiting low spatial and/or temporal locality for execution within a PIM device. That is, the various implementations provide for offloading system services tasks to a PIM unit using an offloading agent (e.g., a PIM agent). Each PIM unit can execute multiple processes as allowed and monitored by the offloading agent. For explanation, in the description below, a "PIM offload instruction" is executed by a processor core, a "PIM command" is generated and issued to a PIM device as a result of executing the PIM offload instruction, and a "PIM instruction" is executed by the PIM device. In various implementations, the system services task offloaded from a host processor to a PIM device for execution may include one or more of optimized page zeroing, optimized copy-on-write (COW), and optimized memory migration. Although various examples are illustrated using optimized page zeroing, optimized COW, and optimized memory migration, in other implementations other suitable tasks associated with low locality may be offloaded from a host processor to a PIM device.

In one aspect, a PIM device can also be a PIM unit and "device," or "unit" can be used interchangeably. In one aspect, as used herein "offloading" refers to the planning, coordinating, configuration and managing of operations related to execution of system services within a PIM. While examples in this disclosure discuss the applicability of the implementations to PIM technology, such examples should not be construed as limiting.

In one or more implementations, these memory task optimizations are enabled or disabled dynamically based on a system state. For example, the OS dynamically determines to turn on or turn off these system services optimizations based on certain performance parameters or counters that the OS can read to determine memory bandwidth utilizations and locality of the system services. In an example, the OS determines a locality value to determine whether to offload the memory task from the host processor to PIM logic. In an example, the locality of these tasks is determined by page access or dirty bits set in corresponding Page Table Entries (PTEs). An access bit set to "1," in some variations for example, indicates that there is some locality which might hint the OS to execute the code on the CPU instead of offloading it to the PIM logic. Additionally, the memory task optimization in some variations is opportunistic in that the memory task optimization is only applicable if the source and destination pages (e.g., for COW and memory migration) are mapped to the same memory channel rather than being mapped to different memory channels. In some implementations, if hardware address mapping information is exposed to the system software, this information is used to aid the system software to dynamically decide whether to execute the system services task on the CPU or to offload to PIM logic.

In an implementation, an apparatus is configured for offloading system service tasks to a processing-in-memory ("PIM") device. The apparatus includes an agent comprising logic configured to: receive, from a host processor, a request to offload a memory task associated with a system service to the PIM device; determine at least one PIM command and at least one memory page associated with the host processor based upon the request; and issue the at least one PIM command to the PIM device for execution by the PIM device to perform the memory task upon the at least one memory page.

In an implementation, the memory task associated with the system service is at least one of a page zeroing operation, a copy-on-write (COW) operation, or a memory migration operation. In an implementation, the agent further comprises logic configured to: receive a PIM load command from the host processor, the PIM load command including an identification of a source memory page storing a plurality of zero values; issue the PIM load command to the PIM device, the PIM device configured to execute the PIM load command to read the plurality of zero values from the source memory page into PIM registers of the PIM device; receive a PIM store command from the host processor, the PIM store command including an identification of a destination memory page; and issue the PIM store command to the PIM device, the PIM device configured to execute the PIM store command to copy the plurality of zero values from the PIM registers to the destination memory page.

In an implementation, the agent further comprises logic configured to: receive a PIM write command from the host processor; issue the PIM write command to the PIM device, the PIM device configured to execute the PIM write command to write a plurality of zero values into a first PIM register of the PIM device; receive a PIM load command from the host processor, the PIM load command including an identification of a destination memory page; issue the PIM load command to the PIM device, the PIM device configured to execute the PIM load command to load a plurality of data values from the destination memory page into a second PIM register of the PIM device; receive a PIM operation command from the host processor, the PIM operation command indicating a logical-AND operation; and issue the PIM operation command to the PIM device, the PIM device configured to execute the PIM operation command to perform a logical-AND operation between the plurality of zero values of the first PIM register and the plurality of data values of the second PIM register to produce a plurality of zeroed output values, the PIM device further configured to store the plurality of zeroed output values in a third PIM register of the PIM device.

In an implementation, the agent further comprises logic configured to: receive a PIM store command from the host processor, the PIM store command including an identification of the destination memory page; and issue the PIM store command to the PIM device, the PIM device configured to execute the PIM store command to copy the plurality of zeroed output values from the third PIM register to the destination memory page.

In an implementation, the agent further comprises logic configured to: receive a PIM load command from the host processor, the PIM load command including an identification of a first memory page; issue the PIM load command to the PIM device, the PIM device configured to execute the PIM load command to read the plurality of data values from the first memory page into PIM registers of the PIM device; receive a PIM store command from the host processor, the PIM store command including an identification of a second memory page; and issue the PIM store command to the PIM device, the PIM device configured to execute the PIM store command to copy the plurality of data values from the PIM registers to the second memory page.

In an implementation, the first memory page is a de-duplicated memory page and the second memory page is a newly allocated memory page. In an implementation, the agent further comprises logic configured to: issue at least one instruction to the PIM device, the PIM device configured to zero out the plurality of data values in the PIM registers and store the zeroed out values in the first memory page. In an implementation, the at least one instruction includes a PIM write instruction to write a plurality of zero values into the PIM register to produce the zeroed out values. In an implementation, the at least one instruction includes a PIM operation command to perform a logical-AND operation between a plurality of zero values and the plurality of data values in the PIM register to produce the zeroed out values.

In an implementation, the request to offload the memory task is received from an operating system associated with the host processor. In an implementation, the request to offload the memory task is received responsive to a determination of a locality value of the memory task by the operating system. In an implementation, the request to offload the memory task is received responsive to a determination of a memory bandwidth utilization associated with the memory task by the operating system. In an implementation, the agent further comprises a memory controller.

Also described in this specification are methods for offloading system service tasks to a PIM device. In an implementation, the method includes: receiving, from a host processor, a request to offload a memory task associated with a system service to the PIM device; determining at least one PIM command and at least one memory page associated with the host processor based upon the request; and issuing the at least one PIM command to the PIM device for execution by the PIM device to perform the memory task upon the at least one memory page.

In an implementation, the memory task associated with the system service is at least one of a page zeroing operation, a copy-on-write (COW) operation, or a memory migration operation.

In an implementation, the method also includes receiving a PIM load command from the host processor, the PIM load command including an identification of a source memory page storing a plurality of zero values; issuing the PIM load command to the PIM device, the PIM device configured to execute the PIM load command to read the plurality of zero values from the source memory page into PIM registers of the PIM device; receiving a PIM store command from the host processor, the PIM store command including an identification of a destination memory page; and issuing the PIM store command to the PIM device, the PIM device configured to execute the PIM store command to copy the plurality of zero values from the PIM registers to the destination memory page.

In an implementation, the method also includes receiving a PIM write command from the host processor; issuing the PIM write command to the PIM device, the PIM device configured to execute the PIM write command to write a plurality of zero values into a first PIM register of the PIM device; receiving a PIM load command from the host processor, the PIM load command including an identification of a destination memory page; issuing the PIM load command to the PIM device, the PIM device configured to execute the PIM load command to load a plurality of data values from the destination memory page into a second PIM register of the PIM device; receiving a PIM operation command from the host processor, the PIM operation command indicating a logical-AND operation; and issuing the PIM operation command to the PIM device, the PIM device configured to execute the PIM operation command to perform a logical-AND operation between the plurality of zero-values of the first PIM register and the plurality of data value of the second PIM register to produce a plurality of zeroed output values, the PIM device further configured to store the plurality of zeroed output values in a third PIM register of the PIM device.

In an implementation, the method also includes receiving a PIM store command from the host processor, the PIM store command including an identification of the destination memory page; and issuing the PIM store command to the PIM device, the PIM device configured to execute the PIM store command to copy the plurality of zeroed output values from the third PIM register to the destination memory page.

In an implementation, the method also includes receiving a PIM load command from the host processor, the PIM load command including an identification of a first memory page; issuing the PIM load command to the PIM device, the PIM device configured to execute the PIM load command to read the plurality of data values from the first memory page into PIM registers of the PIM device; receiving a PIM store command from the host processor, the PIM store command including an identification of a second memory page; and issuing the PIM store command to the PIM device, the PIM device configured to execute the PIM store command to copy the plurality of data values from the PIM registers to the second memory page.

Implementations in accordance with the present disclosure will be described in further detail beginning with FIG. 1. Like reference numerals refer to like elements throughout the specification and drawings. FIG. 1 sets forth a block diagram of an example system 100 for offloading system service tasks to a PIM device in accordance with the present disclosure.

The example system 100 of FIG. 1 includes a host device 130 including a processor 132 that includes one or more processor cores 102, 104, 106, 108. While four processor cores are depicted in FIG. 1, it should be understood that the host device 130 can include more or fewer processor cores than depicted. In various examples, the processor cores 102, 104, 106, 108 are CPU cores, GPU cores, or APU cores of the host device 130. In various examples, the processor cores 102, 104, 106, 108 operate as PIM control engines.

A GPU is a graphics and video rendering device for computers, workstations, game consoles, and similar digital processing devices. A GPU is generally implemented as a co-processor component to the CPU of a computer. The GPU can be discrete or integrated. For example, the GPU can be provided in the form of an add-in card (e.g., video card), stand-alone co-processor, or as functionality that is integrated directly into the motherboard of the computer or into other devices.

The phrase accelerated processing unit ("APU") is considered to be a broad expression. The term 'APU' refers to any cooperating collection of hardware and/or software that performs those functions and computations associated with accelerating graphics processing tasks, data parallel tasks, nested data parallel tasks in an accelerated manner compared to conventional CPUs, conventional GPUs, software and/or combinations thereof. For example, an APU is a processing unit (e.g., processing chip/device) that can function both as a central processing unit ("CPU") and a graphics processing unit ("GPU"). An APU can be a chip that includes additional processing capabilities used to accelerate one or more types of computations outside of a general-purpose CPU. In one implementation, an APU can include a general-purpose CPU integrated on a same die with a GPU, a FPGA, machine learning processors, digital signal processors (DSPs), and audio/sound processors, or other processing unit, thus improving data transfer rates between these units while reducing power consumption. In some implementations, an APU can include video processing and other application-specific accelerators.

It should be noted that the terms processing in memory (PIM), processing near-memory (PNM), or processing in or near-memory (PINM), all refer a device (or unit) which includes a non-transitory computer readable memory device, such as dynamic random access memory (DRAM), and one or more processing elements. The memory and processing elements can be located on the same chip, within the same package, or can otherwise be tightly coupled. For example, a PNM device could include a stacked memory having several memory layers stacked on a base die, where the base die includes a processing device that provides near-memory processing capabilities.

The host device 130 of FIG. 1 is configured to host multi-process execution. For example, each processor core 102, 104, 106, 108 of the host device 130 executes a different process 172, 174, 176, 178 of the same or different application.

In an implementation, the processor cores 102, 104, 106, 108 operate according to an extended instruction set architecture (ISA) that includes explicit support for PIM offload instructions that are offloaded to a PIM device for execution. Examples of PIM offload instruction include a PIM Load and PIM Store instruction among others. In another implementation, the processor cores operate according to an ISA that does not expressly include support for PIM offload instructions. In such an implementation, a PIM driver, hypervisor, or operating system provides an ability for a process to allocate a virtual memory address range that is utilized exclusively for PIM offload instructions. An instruction referencing a location within the aperture will be identified as a PIM offload instruction.

In the implementation in which the processor cores operate according to an extended ISA that explicitly supports PIM offload instructions, a PIM offload instruction is completed by the processor cores 102, 104, 106, 108 when virtual and physical memory addresses associated with the PIM instruction are generated, operand values in processor registers become available, and memory consistency checks have completed. The operation (e.g., load, store, add, multiply) indicated in the PIM offload instruction is not executed on the processor core and is instead offloaded for execution on the PIM device. Once the PIM offload instruction is complete in the processor core, the processor core issues a PIM command, operand values, memory addresses, and other metadata to the PIM device. In this way, the workload on the processor cores 102, 104, 106, 108 is alleviated by offloading an operation for execution on a device external to or remote from the processor cores 102, 104, 106, 108.

The memory addresses of a PIM command refers to, among other things, an entry in a local instruction store (LIS) 122 that stores a PIM instruction that is to be executed by at least one PIM device 181. In the example of FIG. 1, the PIM device 181 is an execution unit 150 that is external to the processor 132 and processor cores 102, 104, 106, 108. In one example, the execution unit includes control logic 114 for decoding instructions or commands issued from the processor cores 102, 104, 106, 108, an arithmetic logic unit (ALU) 116 that performs an operation indicated in the PIM instructions or command, and a register file 118 including a plurality of indexed registers for holding data for load/store operations to memory or intermediate values of ALU computations. In some examples, the ALU 116 is capable performing a limited set of operations relative to the ALUs of the processor cores 102, 104, 106, 108, thus making the ALU 116 less complex to implement and, for example, more suited for an in-memory implementation.

A PIM instruction can move data between the registers and memory, and it can also trigger computation on this data in the ALU 116. In some examples, the execution unit also includes a LIS 122 that stores commands of PIM instructions written into the LIS by the host processor 132. In these examples, the PIM instructions include a pointer to an index in the LIS 122 that includes the operations to be executed in response to receiving the PIM instruction. For example, the LIS 122 holds the actual opcodes and operands of each PIM instruction.

The execution unit 150 is a PIM device 181 that is included in a PIM-enabled memory device 180 (e.g., a remote memory device) having one or more DRAM arrays. In such an implementation, PIM instructions direct the PIM device 181 to execute an operation on data stored in the PIM-enabled memory device 180. For example, operators of PIM instructions include load, store, and arithmetic operators, and operands of PIM instructions can include architected PIM registers, memory addresses, and values from core registers or other core-computed values. The ISA can define the set of architected PIM registers (e.g., eight indexed registers).

In some examples, there is one execution unit per DRAM component (e.g., bank, channel, chip, rank, module, die, etc.), thus the PIM-enabled memory device 180 include multiple execution units 150 that are PIM devices. PIM commands issued from the processor cores 102, 104, 106, 108 can access data from DRAM by opening/closing rows and reading/writing columns (like conventional DRAM commands do). In some implementations, the host processor 132 issues PIM commands to the ALU 116 of each execution unit 150. In implementations with a LIS 122, the host processor 132 issues commands that include an index into a line of the LIS holding the PIM instruction to be executed by the ALU 116. In these implementations with a LIS 122, the host-memory interface does not require modification with additional command pins to cover all the possible opcodes needed for PIM. Each PIM command carries a target address that is used to direct it to the appropriate PIM unit(s) as well as the PIM instruction to be performed. An execution unit 150 can operate on a distinct subset of the physical address space. When a PIM command reaches the execution unit 150, it is serialized with other PIM commands and memory accesses to DRAM targeting the same subset of the physical address space.

The execution unit 150 is characterized by faster access to data relative to the host processor 132. The execution unit 150 operates at the direction of the processor cores 102, 104, 106, 108 to execute memory intensive tasks. In the example of FIG. 1, the execution unit 150 is implemented within a memory partition and is coupled to a memory array 182. The memory array 182 can be one or more arrays of memory cells of a bank, channel, or other memory hierarchy partition. Without loss of generality, when discussing execution units 150 as PIM devices, it is assumed that each execution unit is coupled to a respective memory bank 184 that includes the memory array 182. Readers of skill in the art will appreciate that various configurations of PIM devices and memory partitions (physical or logical) in a PIM-enabled memory device can be employed without departing from the spirit of the present disclosure. The PIM-enabled memory devices can be memory devices such a double data rate (DDRx) memory device, graphics DDRx (GDDRx) memory device, low power DDRx (LPDDRx) memory device, high bandwidth memory (HBM) device, hybrid memory cube (HMC) device, Non-Volatile Random-Access Memory (NV-RAM) device, or other memory device that supports PIM.

The host device 130 also includes at least one memory controller 140 that is shared by the processor cores 102, 104, 106, 108 for accessing a channel of the PIM-enabled memory device 180. In some implementations, the host device 130 can include multiple memory controllers, each corresponding to a different memory channel in the PIM-enabled memory device 180. In some examples, the memory controller 140 is also used by the processor cores 102, 104, 106, 108 for executing one or more processes 172, 174, 176, and 178 and offloading PIM instructions for execution by the execution unit 150.

The memory controller 140 maintains one or more dispatch queues for queuing commands to be dispatched to a memory channel or other memory partition. Stored in memory and executed by the processor cores 102, 104, 106, 108 is an operating system 125 and a PIM driver 124.

In an implementation, the PIM Driver 124 aids in managing multi-process execution in the PIM devices 181, 183. Process 172, 174, 176, 178 can request from the PIM driver registration as a PIM process. To do so, a process provides a process identifier (PID) to the PIM driver 124 through a driver call. The PIM driver 124 registers the process as a PIM process by storing the PID and providing the PID to a memory controller. An offloading agent 145 is logic that is configured to carry out the offloading of system services for execution in PIM devices according to aspects of the present disclosure. In the example of FIG. 1, the offloading agent 145 is a memory controller 140.

In an implementation, the offloading agent 145 of the memory controller 140 receives, from the host processor 132, a request to offload a memory task associated with a system service of the system 100 to the PIM device 181. The offloading agent 145 determines at least one PIM command and at least one memory page associated with the host processor 132 based upon the request. The offloading agent 145 issues the at least one PIM command to the PIM device 181 for execution by the PIM device 181 to perform the memory task upon the at least one memory page. Accordingly, the memory task associated with the system service is offloaded from the host processor 132 for execution by the PIM device 181.

In an implementation, the memory task associated with the system service to be offloaded to a PIM device is an optimized page zeroing operation. Memory pages are often zeroed out by the operating system after termination of a process that utilized the memory pages in order to avoid corrupting a subsequent process that utilizes the same memory pages. In addition, memory pages are often zeroed out by the operating system after termination of a process for security reasons to ensure that a subsequent process cannot read/access the data of the terminated process. Zeroing pages of a terminated process typically occurs in the background. The operation system typically maintains a list of memory pages that need to be zeroed-out. This page zeroing is a memory bound operation with zero locality as these pages are not allocated to any active process and are still to be part of the OS free-list. These memory pages will not be accessed until they are assigned to an active process.

In existing procedures, a baseline operating system operation fetches these memory pages into the CPU to zero them out. This operation not only pollutes data caches but also wastes significant memory and on-chip interconnect bandwidth to fetch these pages on-chip. Additionally, such a data fetch also pollutes the cache prefetchers as the cache prefetchers start training on these new streams of physical addresses. This is an undesired side-effect as this page-zeroing happens in the background and the observed streams are only valid sporadically. Based on the observation that page zeroing unnecessarily wastes memory bandwidth and pollutes caches, implementations in accordance with the present disclosure provide for offloading this zeroing operation to the PIM logic in memory. In one or more implementations, an operating system routine offloads page zeroing to the PIM logic by converting regular loads and stores to PIM loads and stores as further discussed below.

In a first example implementation of page-zeroing, page-zeroing is performed by the operating system utilizing a reserved zero page as a source page and copying the contents of the reserved zero page to a destination page to be zeroed. In the first example implementation, it is assumed that the operation system maintains a reserved zeroed page across all channels and memory banks. The reserved zeroed page contains zero values in all memory locations. In this implementation, the operating system performs page zeroing by copying the data from zeroed source page to the destination page to be zeroed utilizing the PIM device. In this implementation, the operating system zeros the page by issuing a series of PIM load (PIM-Ld) and PIM store (PIM-St) commands. The reserved zeroed page is read into the PIM registers of the PIM device using PIM load commands. Subsequently, PIM Store commands are issued to copy the zero values in the PIM registers to the destination page to be zeroed.

In a second example implementation of page-zeroing, page zeroing is performed by AND-ing the contents of page to be zeroed with zero values. In the second example implementation, the operating system initially issues a PIM write (PIM-Wr) operation that programs a PIM register with zero values. Subsequently, the operating system loads the destination page into the PIM registers using PIM Load (PIM-Ld) commands and performs a logical-AND (or MUL) by issuing a PIM operation (PIM-Op) instruction to zero out the values in the PIM registers. This zeroed output from the PIM registers is written to the destination page using a PIM store (PIM-St) operation.

For the first and second example implementations of page-zeroing, if the page to be zeroed-out is present in CPU caches, it may be necessary to invalidate the page within the cache as the page will be modified by the PIM logic.

In another implementation, the memory task associated with the system service to be offloaded to a PIM device is an optimized copy-on-write (COW) operation. Operating systems and hypervisors use techniques such as Kernel Same page Merging (KSM) for efficient memory de-duplication. These system services allow multiple pages across processes/VMs to point to a single physical page that contain the same data values. Such de-duplication reduces the overall memory consumption and allows more VMs/processes to be executed concurrently on the system. However, once a page is modified, a new page is allocated by the system software and the de-duplicated page is copied to the new page before the new page is modified. This optimization is referred to as Copy-On-Write (COW). In existing procedures, a baseline operating system operation includes the OS/hypervisor fetching the entire de-duplicated page on-chip to copy the data to the newly allocated page. Based on the observation that the newly allocated page may not have high locality, especially in scenarios where large arrays are just initialized and, in some cases, where the source de-duplicated page might not have high locality as well, implementations in accordance with the present disclosure provide for offloading COW optimizations to PIM logic. Such large array initializations are a common practice in high-performance computing (HPC) applications.

In a first example implementation of optimized COW using PIM logic, COW routines in the operating system communicate the source de-duplicated page and the destination newly allocated page physical addresses. The COW routine issues a series of PIM loads (PIM-Lds) from the source page that load the source data into the PIM registers of the PIM device. Subsequently, the operation system issues PIM stores (PIM-Sts) that copy the data from the PIM registers into the destination pages. In a second example implementation of optimized COW using PIM logic, anticipating accesses to the newly allocated pages, COW routines issue regular load operations using CPU logic following PIM stores (PIM-Sts) that fetch the newly allocated and updated pages on-chip.

In another implementation, the memory task associated with the system service to be offloaded to a PIM device is an optimized memory migration operation. memory migration is a commonly executed routine in system software. Most frequently, memory migration is triggered by the system state. For example, assume the operation system performs memory compaction in the background if the memory is heavily fragmented. This is performed to reduce memory fragmentation. Compaction involves migrating a memory page from a source location to a destination location and includes copying the data as well as updating the page tables. This is also a low-locality and memory-bound operation as the background compacted pages may not be actively accessed as they may not be part of the current working set of applications.

Another event that triggers memory migration is page offlining. Page offlining is performed in response to faults in memory that occur due to various reasons. In this case, the system software offlines a memory page so that it might not be assigned to any other process in the future. In some scenarios, the offlined pages are copied to another page before they are offlined. This is again a low-locality and memory-bound operation.

Since a memory migration operation is a copy from one location to another, PIM logic is leveraged in some implementations as in the COW optimization use case described above. However, in compaction routine, since the memory migration is entirely performed in memory, the source page from which the data is moved to the destination page is, in some variations, additionally be zeroed-out after the PIM store (PIM-St) to the destination page. Hence, after performing PIM-St, the operating system zeros out the PIM registers by performing either a PIM write (PIM-Wr) or by performing a logical-AND as described above with respect to the page-zeroing use case. The zeroed out values in the PIM register are then stored in the source compacted page using PIM store (PIM-St). The page being compacted is then returned to the OS free-list instead of the to-be zeroed list of pages.

Figure 2:
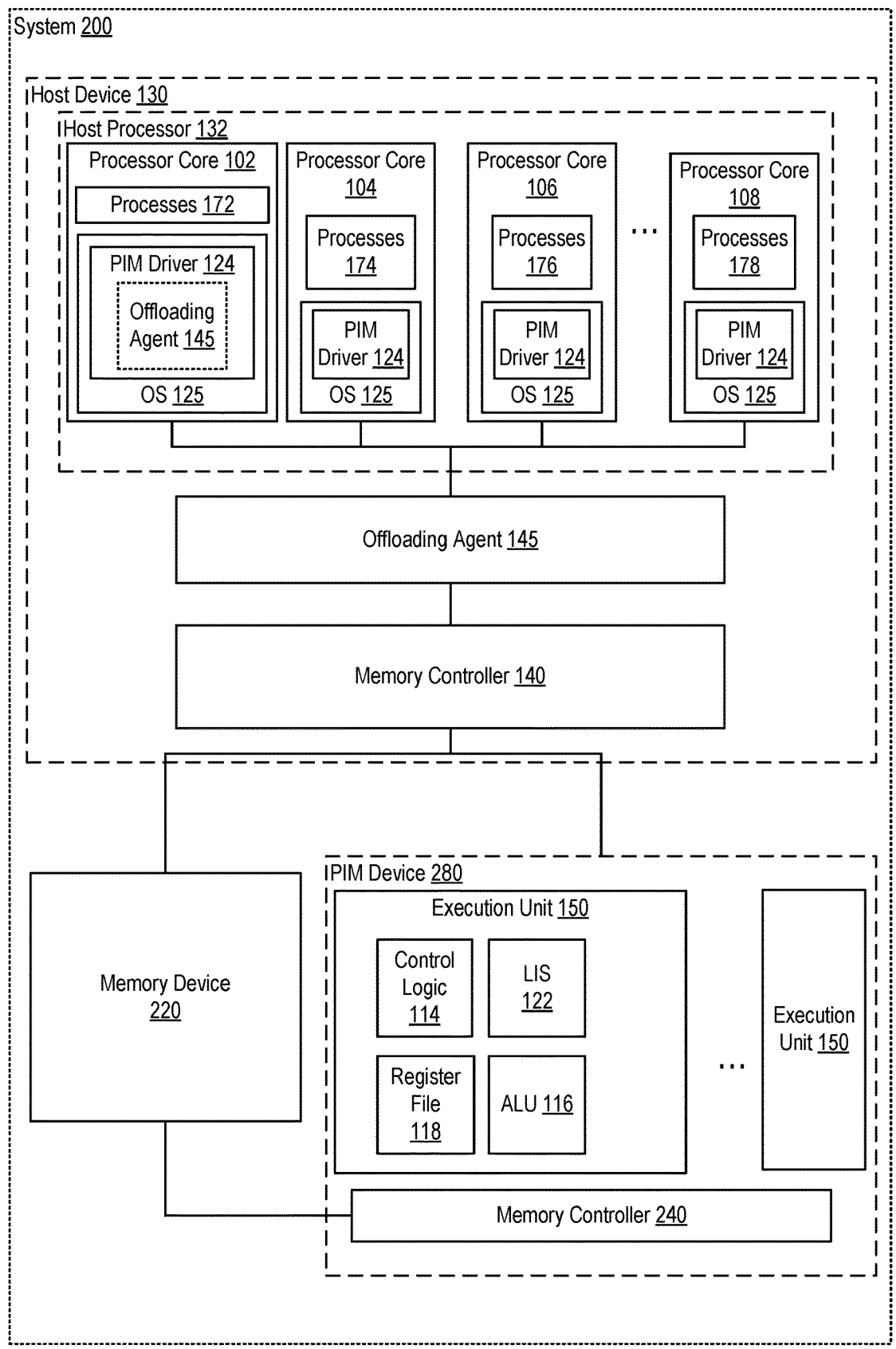
FIG. 2 sets forth a block diagram of another example system 200 for offloading of system services tasks to a PIM device in accordance with the present disclosure.

For further explanation, FIG. 2 sets forth a block diagram of an example system 200 for offloading system service tasks to a PIM device in accordance with the present disclosure. The example system 200 of FIG. 2 includes many of the same components of system 100 of FIG. 1.

In the example of FIG. 2, the execution unit 150 is a component of a PIM device 280 that is implemented in a processing-near-memory (PNM) fashion. For example, the PIM device 280 can be a memory accelerator that is used to execute memory-intensive operations that have been offloaded to by the host processor 132 to the accelerator. The host processor 132 and the PIM device 280 are both coupled to the same memory 220. The host processor 132 provides PIM instructions to the PIM device 280 through the memory controller 140, which the execution unit 150 of the PIM device 280 performs on data stored in the memory 220. Thus, the PIM device 280 is "near" memory in that the execution unit 150 is interposed between the memory controller 140 of the host processor 132 and the memory 220. In some examples, the PIM device 280 is coupled to the memory 220 via a memory controller 240, where the memory 220 is not specifically a PIM-enabled memory. In the example of FIG. 2, the execution unit 150 is not implemented within a particular DRAM component (e.g., bank, channel, chip, rank, module, die, etc.) but is closely coupled to the memory 220. For example, the PIM device 280 can be implemented in the interface die of a 3-D stacked memory device or as a separate die.

Also in the example system 200, an offloading agent 145 is implemented as a component separate from the memory controller 140. An example of such an offloading agent can be a PIM agent implemented as a microcontroller that is configured to perform both configuration and orchestration of PIM operations on the PIM device 280. In such an implementation, when the offloading agent performs the aforementioned offloading of system service tasks to a PIM device, the offloading agent 145 stores the contents of the LIS 122, the contents of the register file, and any other state data for one process and reconfigures the execution unit 150 for the requesting PIM process.

As an alternative to the offloading agent 145 being implemented as logic separate from the memory controller 140, FIG. 2 also shows an offloading agent 145 implemented as a component of the PIM driver 124. In implementations in which the PIM driver 124 can control what work is launched on the PIM orchestrator (GPU, CPU, or PIM agent), the offloading agent 145 can perform the aforementioned offloading of system service tasks to a PIM device. In addition, non-PIM processes can proceed along in parallel with PIM process execution.

Figure 3A:
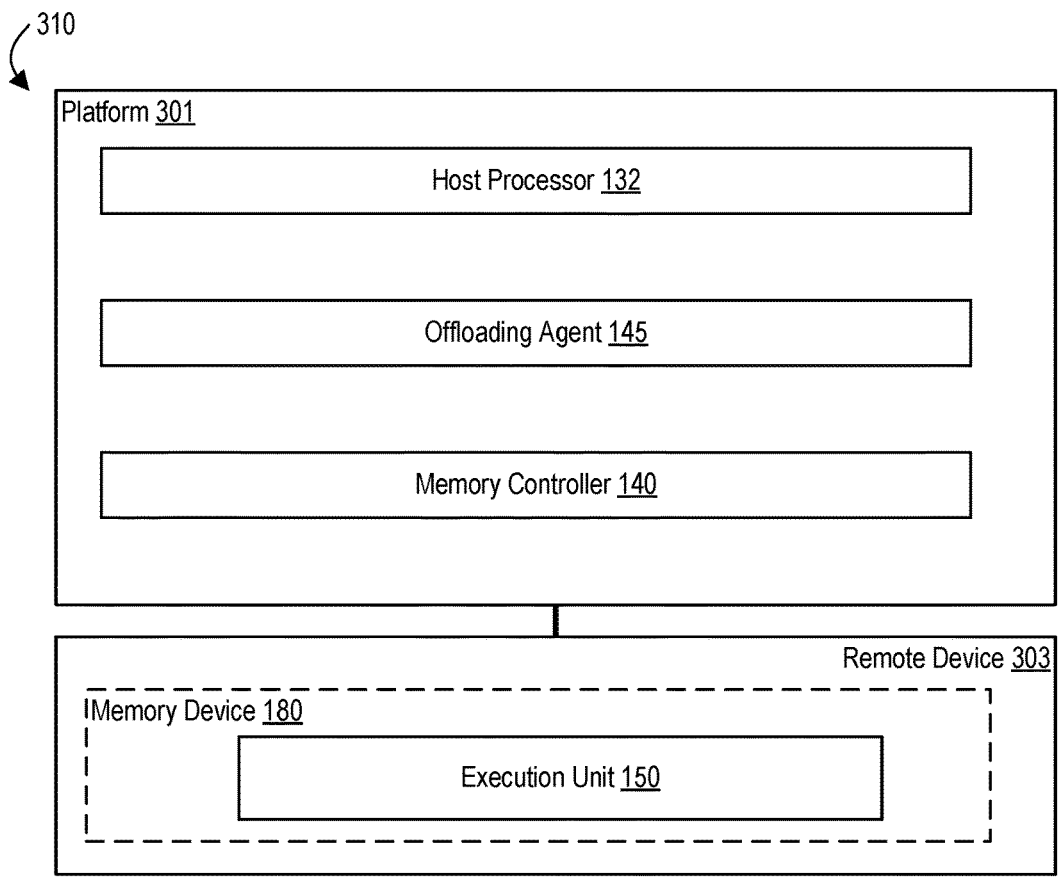
FIG. 3A sets forth a block diagram of an exemplary system configuration 310 for offloading of system services tasks to a PIM device according to some implementations of the present disclosure.

For further explanation, FIG. 3A sets forth a block diagram of an exemplary system configuration 310 for offloading system service tasks to a PIM device according to some implementations of the present disclosure. In the example configuration 310 of FIG. 3A, the memory controller 140, the offloading agent 145, and the host processor 132 and are implemented in the same System-on-Chip (SoC) platform 301. An execution unit 150 is implemented in a remote device 303. In some examples, the execution unit 150 is a component of a remote memory device 180 (e.g., a PIM-enabled memory device) that is implemented in the same package as the SoC platform 301.

Figure 3B:
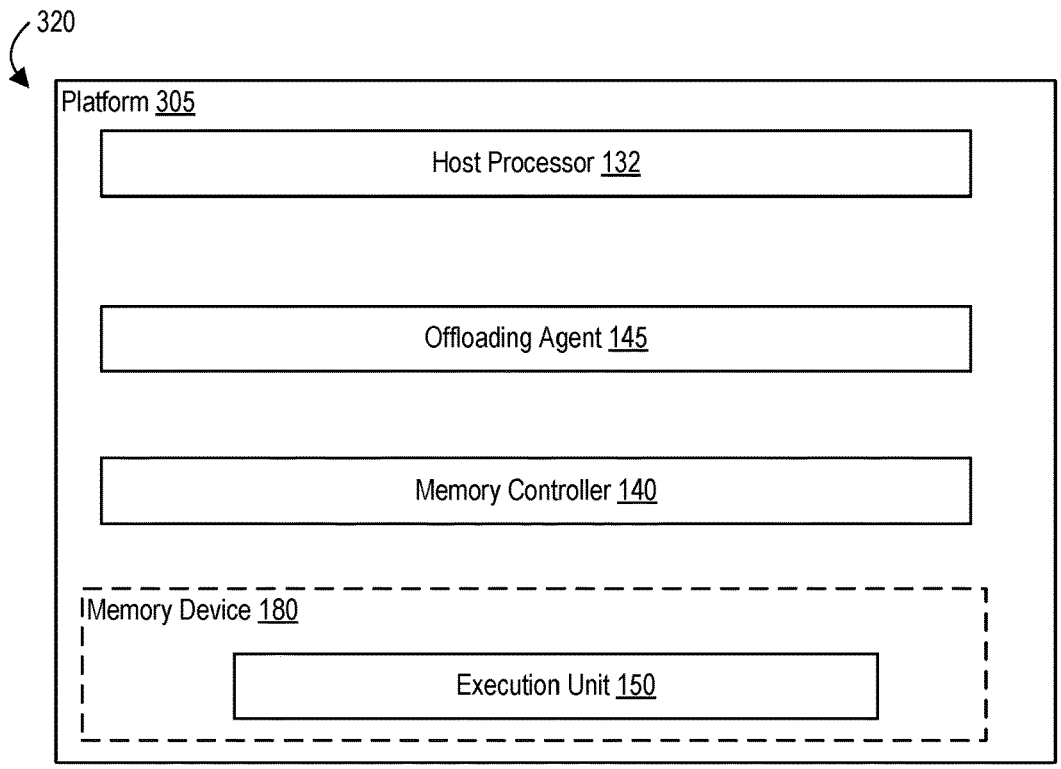
FIG. 3B sets forth another block diagram of an exemplary system configuration 310 for offloading of system services tasks to a PIM device according to some implementations of the present disclosure.

For further explanation, FIG. 3B sets forth another block diagram of an exemplary system configuration 310 for offloading system service tasks to a PIM device according to some implementations of the present disclosure. In the example configuration 320 of FIG. 3B, the execution unit 150, the memory controller 140, the offloading agent 145, and the host processor 132 are implemented on the same SoC platform 305. In some examples, the execution unit 150 is a PIM unit of memory device 180 (e.g., a PIM-enabled memory device) that is also implemented on the same SoC platform 305. Although the execution unit 150 is implemented on the same SoC platform 305 as the host processor 132, it is noted that the execution unit 150 is considered to be external to the host processor 132 in that logic circuitry that implements the execution unit 150 is external to logic circuitry that implements any processor core of the host processor 132.

Figure 4:
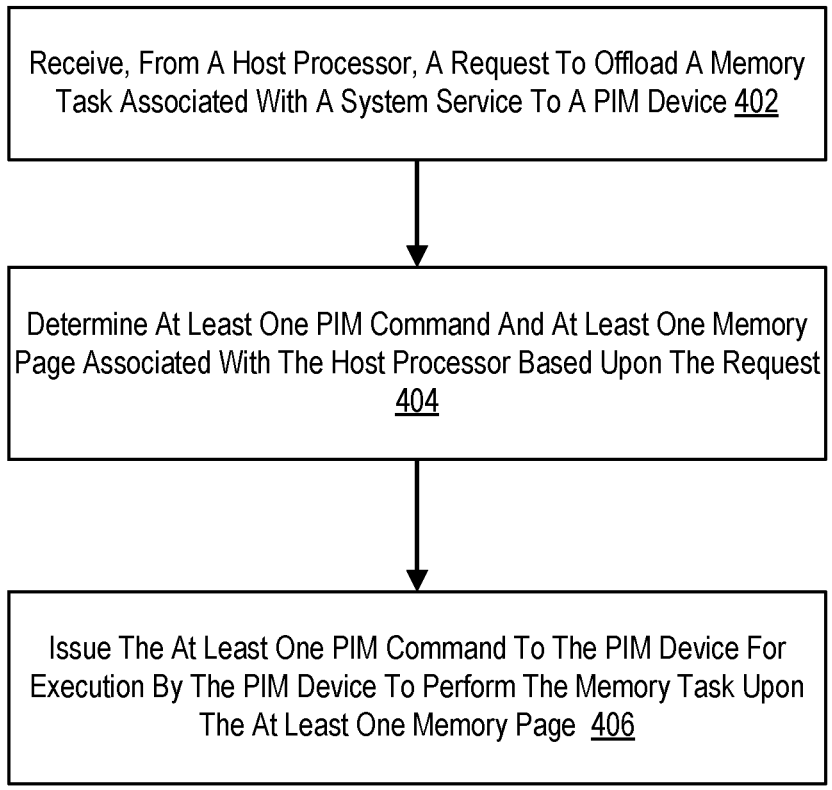
FIG. 4 sets forth a flow chart illustrating an example method of for offloading of system services tasks to a PIM device according to some implementations of the present disclosure.

For further explanation, FIG. 4 sets forth a flow chart illustrating an example method of for offloading system service tasks to a PIM device according to some implementations of the present disclosure. In an implementation, the method of FIG. 4 is carried out by an agent of a memory controller. The method of FIG. 4 includes receiving 402, from a host processor, a request to offload a memory task associated with a system service to the PIM device. In particular implementations, the memory task associated with the system service is at least one of a page zeroing operation, a copy-on-write (COW) operation, or a memory migration operation. Such variations are depicted in further detail with respect to FIGS. 5-8 below. In an implementation, the request to offload the memory task is received from an operating system associated with the host processor. In a particular implementation, the request to offload the memory task is received from the operating system responsive to the operation system determining a locality value of the memory task. For example, the operating system sends the request to the memory controller in response to determining that the memory task has a locality value indicative of a low locality. In another particular implementation, the request to offload the memory task is received from the operating system responsive to the operating system determining a memory bandwidth utilization associated with the memory task. For example, the operating system sends the request to the memory controller in response to determining that the memory task has a high memory bandwidth utilization.

The method of FIG. 4 also includes determining 404 at least one PIM command and at least one memory page associated with the host processor based upon the request. In an implementation, the at least one PIM command and an identification of the at least one memory page is included in the request. In a particular implementation, the identification of the at least one memory page is a physical memory address of the at least one memory page.

The method of FIG. 4 also includes issuing 406 the at least one PIM command to the PIM device for executing by the PIM device to perform the memory task upon the at least one memory page. The PIM device receives the at least one PIM command and an identification of the at least one memory page and executes the PIM command upon the at least one memory page using PIM logic. Accordingly, the memory task associated with the system service is offloaded from the host processor to the PIM device.

Figure 5:
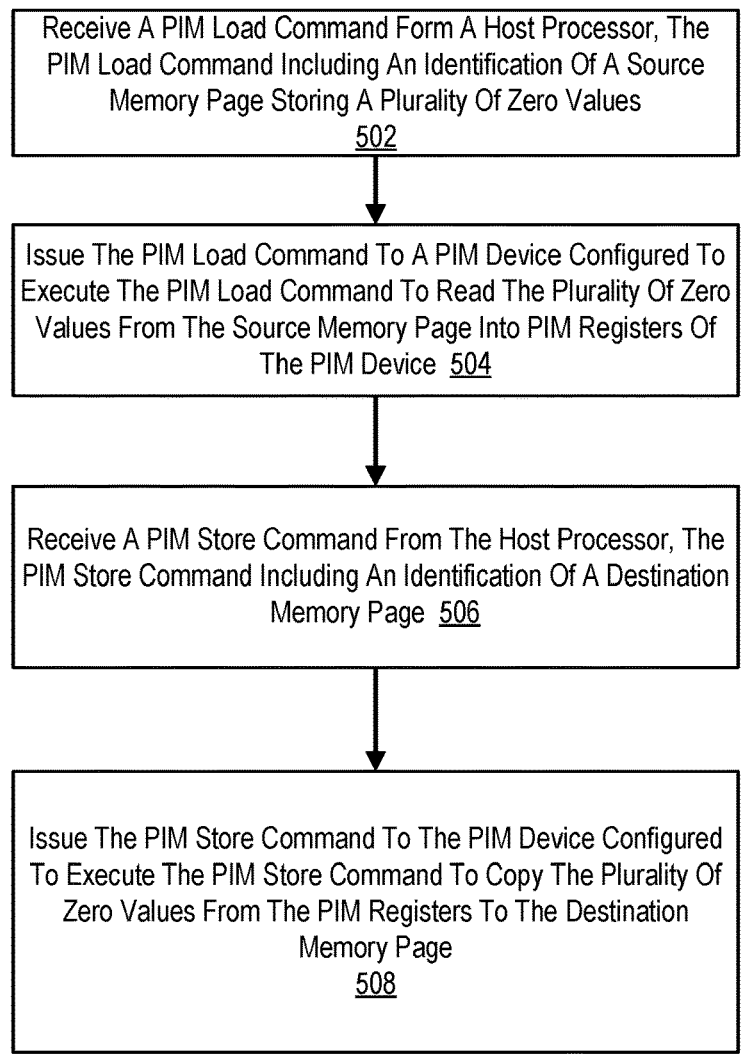
FIG. 5 sets forth a flow chart illustrating an example method of offloading a memory page zeroing task to a PIM device according to some implementations of the present disclosure.

As mentioned above, system service tasks that are offloaded to a PIM device can take various forms including a page zeroing operation, a copy-on-write (COW) operation, or a memory migration operation. FIG. 5 sets forth a flow chart illustrating an example system service task of offloading a memory page zeroing task to a PIM device according to some implementations of the present disclosure. The method of FIG. 5 is carried out by an agent. The method of FIG. 5 includes receiving 502 a PIM load command from a host processor. The PIM load command includes an identification of a source memory page storing a plurality of zero values. In an implementation, it is assumed that the operation system maintains the source memory page as reserved zeroed contains zero values. In an implementation, the identification of the source memory page includes a physical memory address of the source memory page.

The method of FIG. 5 also includes issuing 504 the PIM load command to the PIM device. The PIM device is configured to execute the PIM load command to read the plurality of zero values from the source memory page into PIM registers of the PIM device. The method of FIG. 5 also includes receiving 506 a PIM store command from the host processor. The PIM store command includes an identification of a destination memory page. In an implementation, the identification of the destination memory page includes a physical memory address of the destination memory page.

The method of FIG. 5 also includes issuing 508 the PIM store command to the PIM device. The PIM device is configured to execute the PIM store command to copy the plurality of zero values from the PIM registers to the destination memory page. Accordingly, a memory page zeroing operation is performed on the destination memory page using PIM logic instead of host processor logic.

Figure 6:
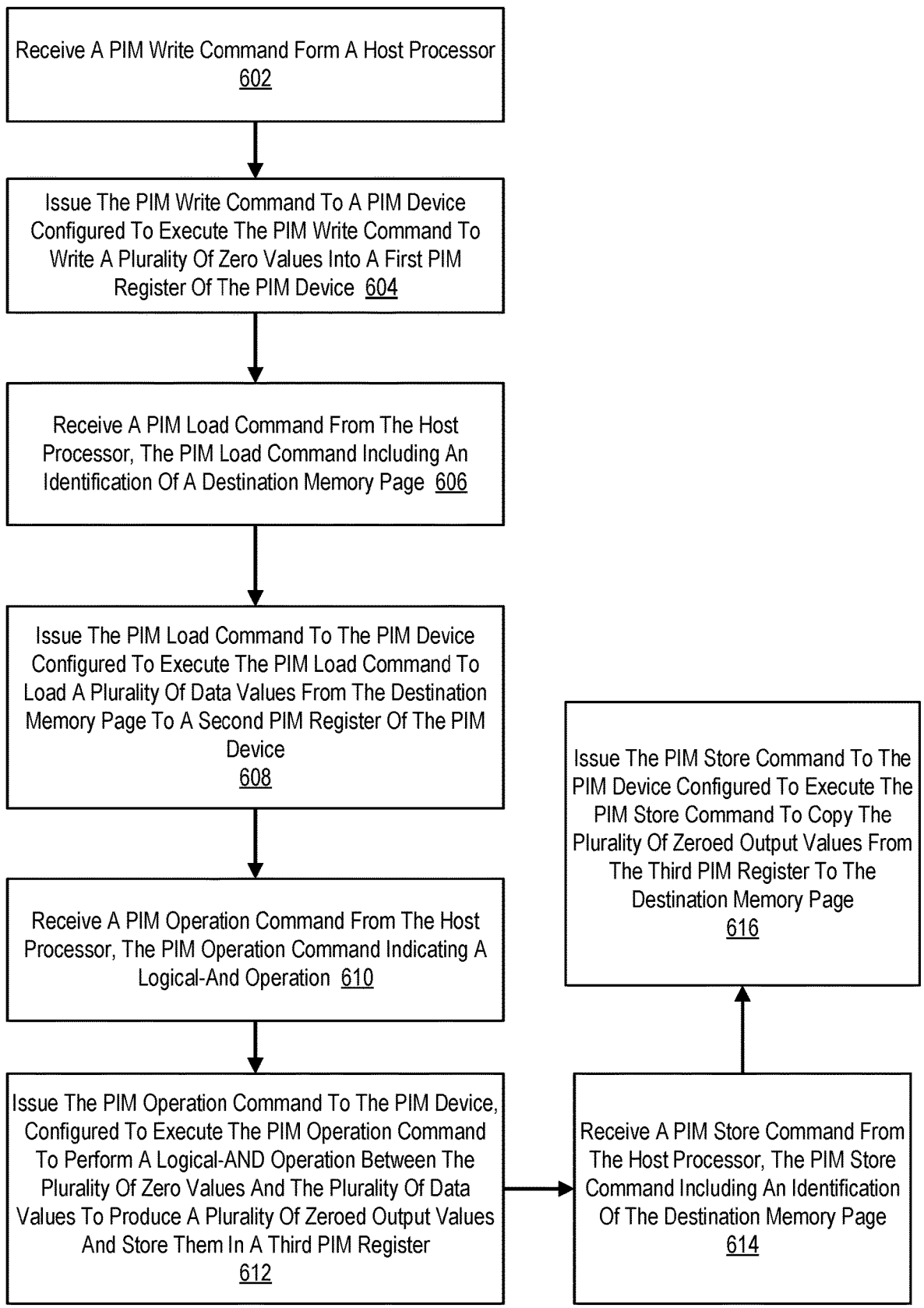
FIG. 6 sets forth a flow chart illustrating another example method of offloading a memory page zeroing task to a PIM device according to some implementations of the present disclosure.

FIG. 6 sets forth a flow chart illustrating another example method of offloading a memory page zeroing task to a PIM device according to some implementations of the present disclosure. The method of FIG. 6 includes receiving 602 a PIM write command from the host processor. The method of FIG. 6 further includes issuing 604 the PIM write command to the PIM device. The PIM device configured to execute the PIM write command to write a plurality of zero values into a first PIM register of the PIM device.

The method of FIG. 6 further includes receiving 606 a PIM load command from the host processor. The PIM load command includes an identification of a destination memory page. In an implementation, the identification of the destination memory page is a physical memory address of the destination memory page. The method of FIG. 6 further includes issuing 608 the PIM load command to the PIM device. The PIM device is configured to execute the PIM load command to load a plurality of data values from the destination memory page into a second PIM register of the PIM device.

The method of FIG. 6 further includes receiving 610 a PIM operation command from the host processor. The PIM operation command indicates a logical-AND operation to be performed by the PIM device between data values in the first PIM register and the second PIM register. In an implementation, the PIM operation command includes an identification of the first PIM register and the second PIM register.

The method of FIG. 6 further includes issuing 612 the PIM operation command to the PIM device. The PIM device is configured to execute the PIM operation command to perform a logical-AND operation between the plurality of zero values of the first PIM register and the plurality of data values of the second PIM register to produce a plurality of zeroed output values. The PIM device is further configured to store the plurality of zeroed output values in a third PIM register of the PIM device.

The method of FIG. 6 further includes receiving 614 a PIM store command from the host processor. The PIM store command includes an identification of the destination memory page. In a particular implementation the identification of the destination memory page includes a physical memory address of the destination memory page.

The method of FIG. 6 further includes issuing 616 the PIM store command to the PIM device. The PIM device is configured to execute the PIM store command to copy the plurality of zeroed output values from the third PIM register to the destination memory page. Accordingly, a memory page zeroing operation is performed on the destination memory page using PIM logic instead of host processor logic.

Figure 7:
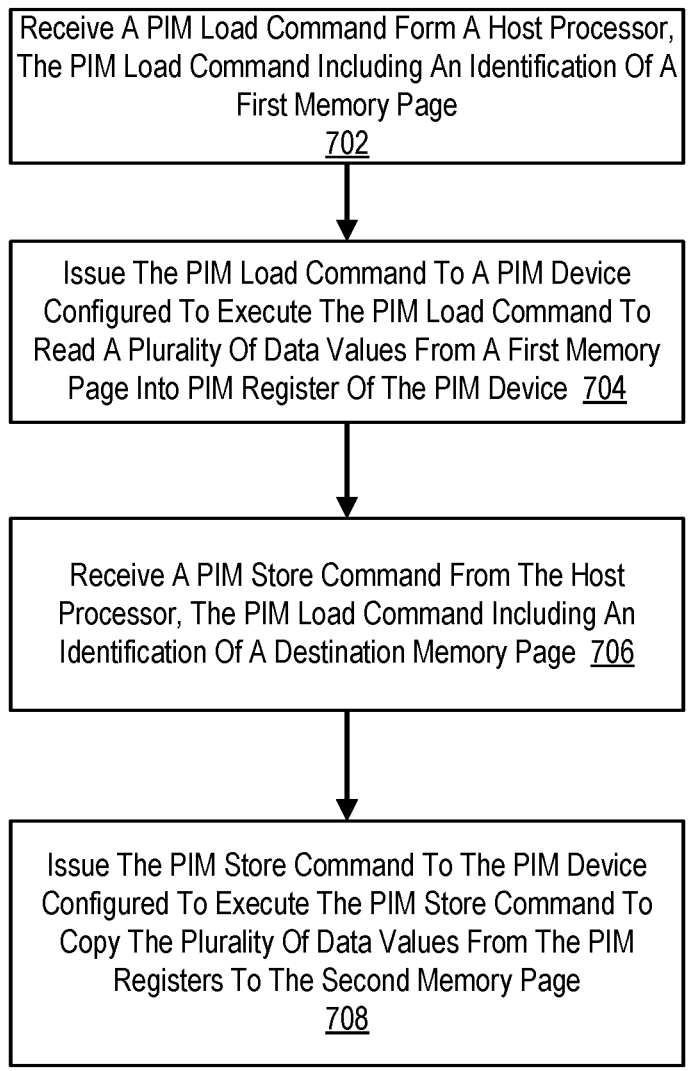
FIG. 7 sets forth a flow chart illustrating an example method of offloading a copy-on-write (COW) task to a PIM device according to some implementations of the present disclosure.

FIG. 7 sets forth a flow chart illustrating an example system service task comprising a copy-on-write (COW) task that is offloaded to a PIM device according to some implementations of the present disclosure. The method of FIG. 7 includes receiving 702 a PIM load command from a host processor that includes an identification of a first memory page. In an implementation, the identification of the first memory page includes a physical memory address of the first memory page. The first memory page is a de-duplicated memory page.

The method of FIG. 7 also includes issuing 704 the PIM load command to the PIM device. The PIM device is configured to execute the PIM load command to read a plurality of data values from the first memory page into PIM registers of the PIM device.

The method of FIG. 7 also includes receiving 706 a PIM store command from the host processor. The PIM store command includes an identification of a second memory page. In an implementation, the identification of the second memory page includes a physical address of the second memory page. The second memory page is a newly allocated memory page.

The method of FIG. 7 also includes issuing 708 the PIM store command to the PIM device. The PIM device is configured to execute the PIM store command to copy the plurality of data values from the PIM registers to the second memory page. Accordingly, a copy-on-write (COW) operation is performed between the first memory page and the second memory page using PIM logic instead of host processor logic.

Figure 8:
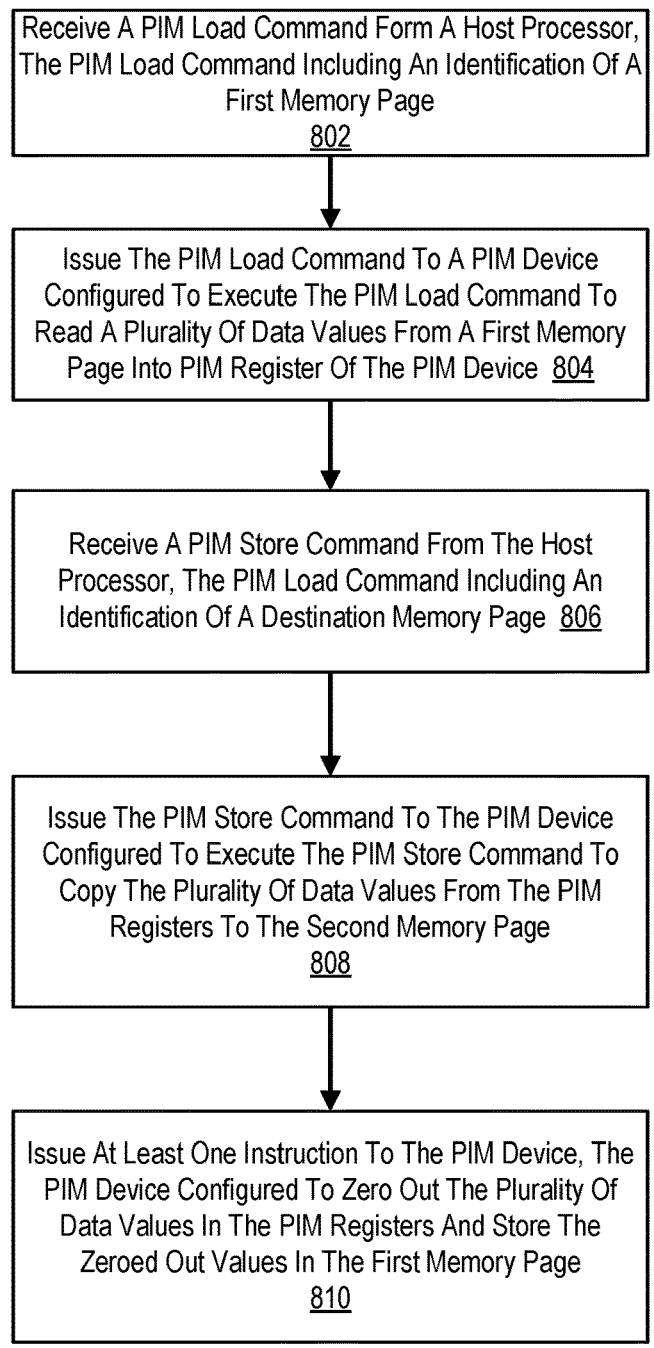
FIG. 8 sets forth a flow chart illustrating an example method of offloading a memory page migration task to a PIM device according to some implementations of the present disclosure.

FIG. 8 sets forth a flow chart illustrating an example of offloading a system service tasks of memory page migration to a PIM device according to some implementations of the present disclosure. The method of FIG. 8 includes receiving 802 a PIM load command from a host processor. The PIM load command includes an identification of a first memory page. In an implementation, the identification of the first memory page includes a physical memory address of the first memory page. The first memory page includes a plurality of data values.

The method of FIG. 8 further includes issuing 804 the PIM load command to the PIM device. The PIM device is configured to execute the PIM load command to read the plurality of data values from the first memory page into PIM registers of the PIM device.

The method of FIG. 8 further includes receiving 806 a PIM store command from the host processor. The PIM store command includes an identification of a second memory page. In an implementation, the identification of the second memory page includes a physical address of the second memory page.

The method of FIG. 8 further includes issuing 808 the PIM store command to the PIM device. The PIM device is configured to execute the PIM store command to copy the plurality of data values from the PIM registers to the second memory page. The method of FIG. 8 further includes issuing 810 at least one instruction to the PIM device. The PIM device is configured to zero out the plurality of data values in the PIM registers and store the zeroed out values in the first memory page. In an implementation, the at least one instruction includes a PIM write instruction to write a plurality of zero values into the PIM register to produce the zeroed out values. In another implementation, the at least one instruction includes a PIM operation command to perform a logical-AND operation between a plurality of zero values and the plurality of data values in the PIM register to produce the zeroed out values.

In an implementation, the zeroed out first memory page is then returned to the OS free-list. Accordingly, a memory page migration operation is performed between the first memory page and the second memory page using PIM logic instead of host processor logic.

Implementations can be a system, an apparatus, a method, and/or logic. Computer readable program instructions in the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In some implementations, electronic circuitry including, for example, programmable logic circuitry, field-programmable gate arrays (FPGA), or programmable logic arrays (PLA) can execute the computer readable program instructions by utilizing state information of the computer readable program instructions.

Aspects of the present disclosure are described herein with reference to flowchart illustrations and/or block diagrams of methods, apparatus (systems), and logic circuitry according to some implementations of the disclosure. It will be understood that each block of the flowchart illustrations and/or block diagrams, and combinations of blocks in the flowchart illustrations and/or block diagrams, can be implemented by logic circuitry.

The logic circuitry can be implemented in a processor, other programmable data processing apparatus, or other device to cause a series of operational steps to be performed on the processor, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and logic circuitry according to various implementations of the present disclosure. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

While the present disclosure has been particularly shown and described with reference to implementations thereof, it will be understood that various changes in form and details can be made therein without departing from the spirit and scope of the following claims. Therefore, the implementations described herein should be considered in a descriptive sense only and not for purposes of limitation. The present disclosure is defined not by the detailed description but by the appended claims, and all differences within the scope will be construed as being included in the present disclosure.

What is claimed is:

1. An apparatus comprising:
   a processing-in-memory ("PIM") device; and
   a memory controller operatively coupled to a host processor and operatively coupled to the PIM device, wherein the memory controller is configured to:
   in response to a request to offload one or more memory tasks associated with a system service from the host processor to the PIM device, wherein the one or more memory tasks include a page zeroing operation,
   offload the page zeroing operation to the PIM device for execution by the PIM device to perform the page zeroing operation upon a first memory page, wherein the memory controller offloads the page zeroing operation by issuing two or more PIM commands to place a plurality of zero values in one or more PIM registers of the PIM device and copy the plurality of zero values from the one or more PIM registers to the first memory page.

2. The apparatus of claim 1, wherein the two or more PIM commands include:
   a PIM load command, the PIM device configured to execute the PIM load command to read the plurality of zero values from a source memory page into the one or more PIM registers of the PIM device; and
   a PIM store command, the PIM device configured to execute the PIM store command to copy the plurality of zero values from the one or more PIM registers to the first memory page.

3. The apparatus of claim 1, wherein the two or more PIM commands include:
   a PIM write command, the PIM device configured to execute the PIM write command to write a plurality of zero values into a first PIM register of the PIM device;
   a PIM load command, the PIM device configured to execute the PIM load command to load a plurality of data values from the first memory page into a second PIM register of the PIM device;
   a PIM operation command, the PIM device configured to execute the PIM operation command to perform a logical-AND operation between the plurality of zero values of the first PIM register and the plurality of data values of the second PIM register to produce a plurality of zeroed output values, the PIM device further configured to store the plurality of zeroed output values in a third PIM register of the PIM device; and
   a PIM store command, the PIM device configured to execute the PIM store command to copy the plurality of zeroed output values from the third PIM register to the first memory page.

4. The apparatus of claim 1, wherein the one or more memory tasks further include a copy-on-write operation and the memory controller is configured to offload the copy-on-write operation to the PIM device by:
   issuing a PIM load command to the PIM device, the PIM device configured to execute the PIM load command to read a plurality of data values from a source memory page into one or more PIM registers of the PIM device; and
   issuing a PIM store command to the PIM device, the PIM device configured to execute the PIM store command to copy the plurality of data values from the one or more PIM registers to the first memory page.

5. The apparatus of claim 4, wherein the source memory page is a de-duplicated memory page and the first memory page is a newly allocated memory page.

6. The apparatus of claim 1, wherein the one or more memory tasks further include a page migration operation and the memory controller is configured to offload the page migration operation to the PIM device by:
   issuing a PIM load command to the PIM device, the PIM device configured to execute the PIM load command to read a plurality of data values from a source memory page into one or more PIM registers of the PIM device; and issuing a PIM store command to the PIM device, the PIM device configured to execute the PIM store command to copy the plurality of data values from the one or more PIM registers to the first memory page; and performing a second page zeroing operation on the source memory page.

7. The apparatus of claim 1, wherein the request to offload the one or more memory tasks is received from an operating system associated with the host processor.

8. The apparatus of claim 7, wherein the request to offload the one or more memory tasks is received responsive to a determination of a locality value of the one or more memory tasks by the operating system.

9. The apparatus of claim 7, wherein the request to offload the one or more memory tasks is received responsive to a determination of a memory bandwidth utilization associated with the one or more memory tasks by the operating system.

10. A method for offloading system service tasks to a processing-in-memory ("PIM") device, the method comprising:
    in response to a request to offload one or more memory tasks associated with a system service from a host processor to the PIM device, wherein the one or more memory tasks includes a page zeroing operation, offloading the page zeroing operation to the PIM device for execution by the PIM device to perform the page zeroing operation upon a first memory page, including issuing two or more PIM commands to place a plurality of zero values in one or more PIM registers of the PIM device and copy the plurality of zero values from the one or more PIM registers to the first memory page.

11. The method of claim 10, wherein issuing two or more PIM commands includes:
   issuing a PIM load command to the PIM device, the PIM device configured to execute the PIM load command to read the plurality of zero values from a source memory page into one or more PIM registers of the PIM device; and
   issuing a PIM store command to the PIM device, the PIM device configured to execute the PIM store command to copy the plurality of zero values from the one or more PIM registers to the first memory page.

12. The method of claim 10, wherein issuing two or more PIM commands includes:
   issuing a PIM write command to the PIM device, the PIM device configured to execute the PIM write command to write a plurality of zero values into a first PIM register of the PIM device;
   issuing a PIM load command to the PIM device, the PIM device configured to execute the PIM load command to load a plurality of data values from the first memory page into a second PIM register of the PIM device;
   issuing a PIM operation command to the PIM device, the PIM device configured to execute the PIM operation command to perform a logical-AND operation between the plurality of zero values of the first PIM register and the plurality of data values of the second PIM register to produce a plurality of zeroed output values, the PIM device further configured to store the plurality of zeroed output values in a third PIM register of the PIM device; and
   issuing a PIM store command to the PIM device, the PIM device configured to execute the PIM store command to copy the plurality of zeroed output values from the third PIM register to the first memory page.

13. The method of claim 10, wherein the one or more memory tasks include a copy-on-write operation, the method further comprising offloading the copy-on-write operation to the PIM device, the offloading including:
   issuing a PIM load command to the PIM device, the PIM device configured to execute the PIM load command to read a plurality of data values from a source memory page into one or more PIM registers of the PIM device; and
   issuing a PIM store command to the PIM device, the PIM device configured to execute the PIM store command to copy the plurality of data values from the one or more PIM registers to the first memory page.

14. The method of claim 13, wherein the source memory page is a de-duplicated memory page and the first memory page is a newly allocated memory page.

15. The method of claim 13 further comprising issuing at least one instruction to the PIM device, the PIM device configured to zero out the plurality of data values in the one or more PIM registers and store zeroed out values in the source memory page.

16. The method of claim 10, wherein the one or more memory tasks further include a page migration operation and the method further includes offloading the page migration operation to the PIM device by:
   issuing a PIM load command to the PIM device, the PIM device configured to execute the PIM load command to read a plurality of data values from a source memory page into one or more PIM registers of the PIM device; and
   issuing a PIM store command to the PIM device, the PIM device configured to execute the PIM store command to copy the plurality of data values from the one or more PIM registers to the first memory page; and
   performing a second page zeroing operation on the source memory page.

17. The method of claim 10, wherein the request to offload the one or more memory tasks is received responsive to a determination of a locality value of the one or more memory tasks by the operating system.

18. The method of claim 10, wherein the request to offload the one or more memory tasks is received responsive to a determination of a memory bandwidth utilization associated with the one or more memory tasks by the operating system.

* * * * *